(12) United States Patent
Kristensen et al.

(10) Patent No.: US 6,228,016 B1
(45) Date of Patent: May 8, 2001

(54) SEALING DEVICE FOR A CENTRIFUGAL SEPARATOR

(75) Inventors: Aksel Kristensen, Södertälje; Sven-Åke Nilsson, Gnesta; Jouko Pitkämäki, Tumba; Carl Peder Öhlander, Hägersten; Robert Sandblom, Älvsjö, all of (SE)

(73) Assignee: Alfa Laval AB, Tumba (SE)

( * ) Notice: Subject to any disclaimer, the term of this patent is extended or adjusted under 35 U.S.C. 154(b) by 0 days.

(21) Appl. No.: 09/424,051

(22) PCT Filed: Jun. 9, 1998

(86) PCT No.: PCT/SE98/01104

§ 371 Date: Nov. 17, 1999

§ 102(e) Date: Nov. 17, 1999

(87) PCT Pub. No.: WO98/57751

PCT Pub. Date: Dec. 23, 1998

(30) Foreign Application Priority Data

Jun. 16, 1997 (SE) .................................................. 9702290

(51) Int. Cl.$^7$ .................................................. B04B 15/02
(52) U.S. Cl. .................................. 494/14; 494/15; 494/39; 494/41; 494/46; 494/83; 384/467; 384/476
(58) Field of Search .................................. 494/15, 39, 41, 494/46, 83, 14; 384/467, 476

(56) References Cited

U.S. PATENT DOCUMENTS 4,654,023  3/1987  Foldhazy .................................. 494/41
6,117,063 * 9/2000  Szepessy et al. ...................... 494/14

FOREIGN PATENT DOCUMENTS

| 2343506 | 4/1974 | (DE) . |
| 0054502 | 6/1982 | (EP) . |
| 0756897 A1 | 2/1997 | (EP) . |
| 422391 | 1/1935 | (GB) . |
| 361080 | 10/1973 | (SE) . |

OTHER PUBLICATIONS

International Search Report.

* cited by examiner

*Primary Examiner*—W. L. Walker
*Assistant Examiner*—Michael A. Fleming
(74) *Attorney, Agent, or Firm*—Fish & Richardson P.C.

(57) ABSTRACT

A simple but still effective sealing device to separate two openings (4, 5), which are arranged at a distance from each other in the outer casing (3) of a shaft suspension unit (1), which supports a shaft (2) of a centrifugal separator in a bearing (8, 9), the shaft extending axially through at least one opening (4) into a space surrounding the shaft (2) in the outer casing (3). The sealing device is provided with sealing elements (12, 13), one connected to the outer casing (3) and one connected to the shaft (2), which surround the shaft (2) and divide the space in two departments (15, 16) connected to one opening each (4, 5, respectively). The sealing elements form between themselves a narrow gap (14) surrounding the shaft (2), which prevents the flow of gas between the departments (15, 16). One of the sealing elements (12, 13) has a channel (21), which has an opening (23) in a central part of the gap (14), for the supply of a sealing liquid under pressure to the gap (14) in such a way that oil flows from the opening (23) through the gap (14) and out into the two departments (15, 16).

6 Claims, 1 Drawing Sheet

SEALING DEVICE FOR A CENTRIFUGAL SEPARATOR

FIELD OF THE INVENTION

The present invention concerns a sealing device to separate two openings, which are arranged at a distance from each other in an outer casing of a shaft suspension unit, which is arranged during operation to rotatably support a shaft of a centrifugal separator in at least one bearing, the shaft extending through at least one of said openings into a space surrounding the shaft formed inside the outer casing.

BACKGROUND OF THE INVENTION

In shaft suspension units of this kind the shaft and parts connected thereto and rotating with the shaft during operation entrain the air or other gas, which is located in this space. This air or gas contains oil drops in the form of an oil mist, which is used to lubricate bearings arranged in the shaft suspension unit. By the rotation of the air the air pressure will be different in different parts of the space, which means that the air pressure as a rule is different at the two openings. This causes an often very high air flow in through the one opening and out through the other opening, whereby the oil drops are lost for their purpose and pollute the surroundings of the shaft suspension unit. Furthermore, particles, bacteria etc. might enter the shaft suspension unit and decrease the lifetime of the bearings or create colonies of bacteria.

In U.S. Pat. No. 4,654,023 there is shown a centrifugal separator with a shaft suspension unit, which has an opening through which the shaft of the centrifugal separator extends. At this opening there is arranged a mechanical sealing, which has a sealing element, which is connected to the shaft, and a sealing element, which is connected to a stationary outer casing of the shaft suspension unit, and which effectively prevents air or gas flow through the opening.

However, mechanical sealings of this kind are complicated, expensive and often consume a high effect. Furthermore, they are worn out quickly at the very high number of revolutions of centrifugal separators. Since they are difficult and time consuming to replace this involves high labour and downtime costs.

SUMMARY OF THE INVENTION

The object of the present invention is to accomplish a sealing device of the kind initially described, which separates the two openings and is simple but still it prevents effectively an air flow through the two openings without being worn out and involve high labour and downtime costs.

According to the present invention this is accomplished by providing a sealing device of this kind with a first sealing element connected to the outer casing and a second sealing element connected to the shaft, the sealing elements surrounding the shaft and together dividing the space in two departments connected to one opening each and forming there-between a narrow gap surrounding the shaft with no direct contact with each other, the gap being arranged during operation to prevent a flow of gas between the two departments. One of the sealing elements is provided with at least one channel, which has an opening in the central part of the gap, for the supply of a sealing liquid under pressure to the gap during operation in such a way that sealing liquid flows out of the opening through the gap filled up with sealing liquid in a direction to and out into the two departments.

In a preferred embodiment of the invention the opening of the channel is arranged in a recess surrounding the shaft, the recess being formed in the first sealing element and is open towards the second sealing element.

Hereby a sealing device is accomplished, which effectively prevents airflow through the two openings.

Suitably, the sealing liquid consists of an oil, which continuously is supplied to the shaft suspension unit for the lubrication and/or cooling of the bearing. At least a portion of the oil, which flows out into a department from the gap, is conducted to the bearing located in this department. To accomplish this elements present in this department and rotating with the shaft are used, the elements creating during operation an air circulation conducting the oil in the form of drops to the bearing.

In a special embodiment of the invention it comprises a conduit for return conducting a portion of the oil flowing out into one department from the gap directly to a collecting vessel.

BRIEF DESCRIPTION OF THE DRAWING

In the following the invention will be described in more detail with reference to the FIGURE on the attached drawing which schematically shows an axial section through an axial suspension unit in a centrifugal separator, which is provided with an embodiment of a sealing device according to the present invention.

DETAILED DESCRIPTION

Figure 1:
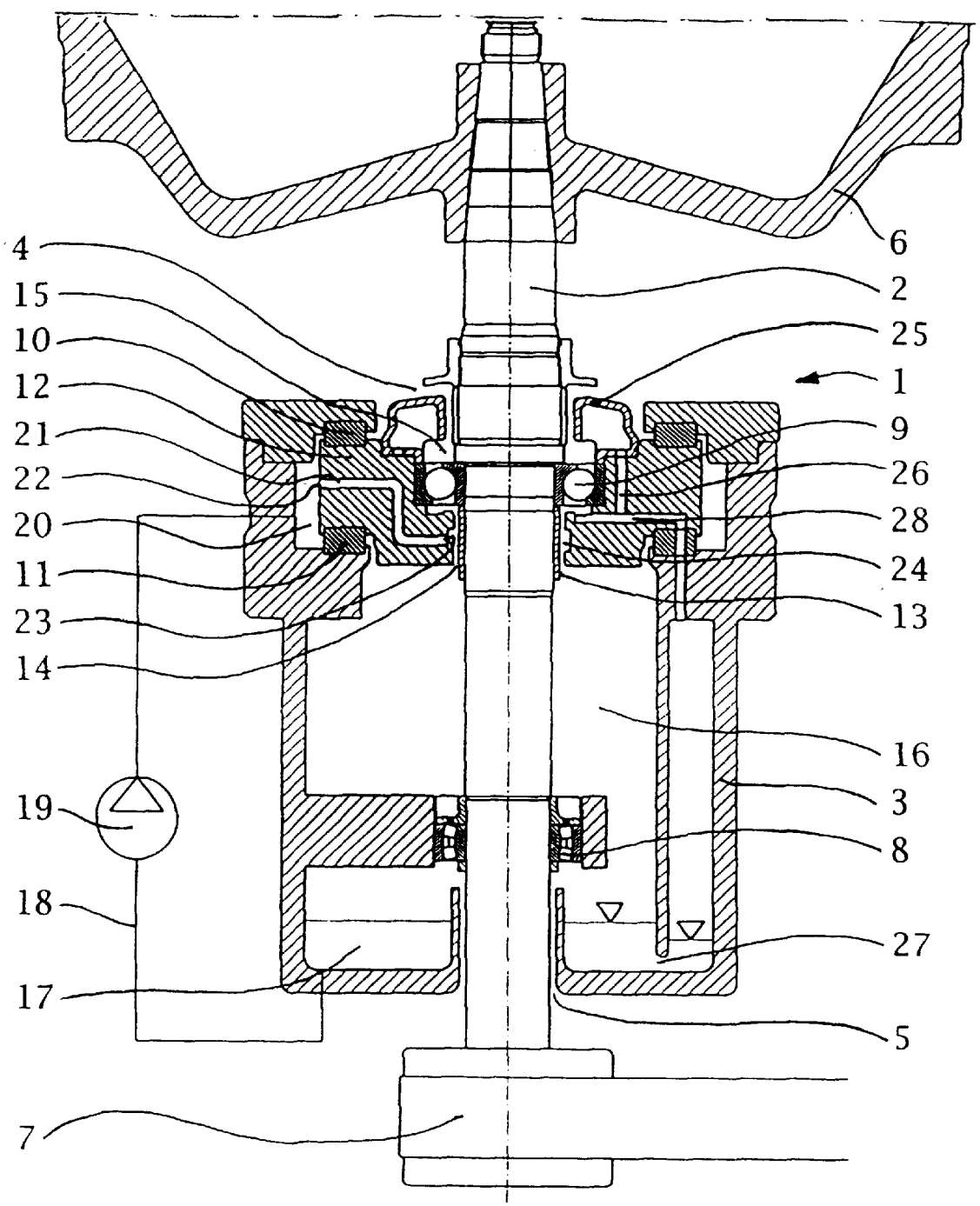

The shaft suspension unit 1 shown in the FIGURE supports the shaft 2 of the centrifugal separator. The shaft suspension unit 1 has an outer casing 3, which surrounds the shaft 2. In the axial end portions of the outer casing 3 there are arranged two openings 4 and 5, respectively, through which the shaft 2 extends. On one axial end of the shaft 2 a rotor 6 is fixedly mounted and on the other axial end of it a belt drive 7 is arranged for the driving of the shaft 2. The shaft 2 is journally supported in a lower bearing 8, which essentially is connected directly to the outer casing 3, and in an upper bearing 9, which is connected to the outer casing 3 via two annular elastical elements 10 and 11. The elastical elements 10 and 11 bear against a first annular sealing element 12, which extends around the shaft 2 and connects the elastical elements 10 and 11 to the upper bearing 9 at the same time as it constitutes a bearing housing for the upper bearing 9. Radially inside the first sealing element 12 there is arranged a second annular sealing element 13, which is connected to the shaft 2 around the same and together with the first sealing element 12 forms an annular gap 14 surrounding the shaft 2.

The sealing elements 12 and 13 divide a space inside the outer casing in two departments 15 and 16, which are connected to one opening each 4 and 5, respectively. To prevent the air or gas volumes from communicating with each other during operation via the gap 14 this is arranged to be kept filled up with liquid.

For this purpose a collecting vessel 17 for oil is arranged in the lower part of the shaft suspension unit 1, to which a conduit 18 is connected. This conduit is provided with a pump 19 and opens in at least one closed chamber 20 radially outside the first sealing element 12. In the first sealing element 12 there is arranged a channel 21, which has an inlet opening 22 in the chamber 20 and an opening 23 in a recess 24, which is formed in a central part of the first sealing element 12. The recess 24 surrounds the shaft and is open towards the second sealing element 13. In the shown example the channel 21 is arranged during operation to be flown through by oil under pressure, which fills up the gap 14. The oil in the gap 14 prevents effectively air or other gas to flow between the two departments 15 and 16.

The amount of oil which flows through the gap 14 in direction towards and out into the one or the other of the two departments 15 and 16 is depending on how long and how narrow the gap 14 is in direction towards the one department 15 in relation to how long and narrow the gap is in the direction towards the other department 16. Elements which rotate with the shaft in the one department 15 creates an air circulation, which entrains oil, which flows out into this department 15, and brings a portion of this oil to flow towards and through the bearing present in this department, the upper bearing 9. The oil, which has passed through the upper bearing 9, is collected in the collection grove 25, which is open radially inwardly and is connected to a return conduit 26, through which collected oil flows back to a collecting vessel 17 via a liquid seal 27, which prevents air or gas circulation through the return conduit 26. The most of the oil, flowing out of said one department 15 is conducted back directly to the collecting chamber 17 via a by-pass conduit 28, which in the shown example is connected to the return conduit 26.

Oil is supplied to the gap 14 at such a high pressure during operation that the gap is kept filled up at the pressure differences prevailing between the two departments 15 and 16. In certain cases the capillary forces can be enough to keep the gap filled up whereas in other cases a substantially higher pressure is demanded to keep the gap 14 filled up with oil.

In the shown example the departments 15 and 16 communicate with the atmosphere surrounding the shaft suspension unit 1 via the respective opening 4 and 5 but it is quite possible within the scope of the present invention that they communicate via adhering opening to a more or less closed chamber.

What is claimed is:

1. A sealing device to separate two openings (4, 5), which are arranged at a distance from each other in an outer casing (3) of a shaft suspension unit (1), which is arranged during operation to rotatably support a shaft (2) of a centrifugal separator in at least one bearing (8, 9), the shaft (2) extending through at least one of said openings (4) into a space surrounding the shaft (2) formed inside the outer casing (3), comprising a first sealing element (12) connected to the outer casing (3) and a second sealing element (13) connected to the shaft (2), the sealing elements (12, 13) surrounding the shaft (2) and together dividing the space in two departments (15, 16) connected to one opening each (4, 5) respectively and forming them between a narrow gap (14) surrounding the shaft with no direct contact with each other, the gap being arranged during operation to prevent a flow of gas between the two departments (15, 16), at least one bearing (9), in which the shaft is rotatably supported in the outer casing, being arranged in one of the departments (15) and one of the sealing elements (12, 13) being provided with at least one channel (21), which has an opening (23) in a central part of the gap (14), for the supply of an oil under pressure to the gap (14) during operation in such a way that oil flows out of the opening through the gap (14) filled up with oil in a direction to and out into the two departments (15, 16) and means being provided to conduct at least a portion of the oil flowing into said one of the departments (15) to the bearing (9) arranged in this department.

2. A sealing device according to claim 1, wherein the opening (23) of the channel is arranged in a recess (24) surrounding the shaft (2) and is formed in one sealing element and is open towards the other sealing element (13).

3. A sealing device according to claim 1 or 2, wherein the shaft (2) is journally supported in the outer casing (3) by at least one bearing in each department (15, 16) and has means provided to conduct at least a portion of the oil flowing out into one department (15, 16), to the bearing (8, 9) present in this department (15, 16).

4. A sealing device according to claim 3, wherein said means consist of elements rotating with the shaft (2), the elements being arranged to create during operation a circulation of air entraining oil in the form of drops to the bearing (9).

5. A sealing device according to claim 3, further comprising a by-pass conduit for return conducting a portion of the oil flowing out into one department (15) from the gap (14) directly to a collecting vessel (17).

6. A sealing device according to claim 4, further comprising a by-pass conduit for return conducting a portion of the oil flowing out into one department (15) from the gap (14) directly to a collecting vessel (17).

* * * * *